[19] Hidaka et al.

[11] Patent Number: 4,515,252
[45] Date of Patent: May 7, 1985

[54] PISTON STROKE RESPONSIVE VORTEX-FLOW SHOCK ABSORBER

[75] Inventors: Kunihiko Hidaka, Yokohama; Naoto Fukushima, Kamakura; Kazuro Iwata, Zushi, all of Japan

[73] Assignee: Nissan Motor Company, Limited, Yokohama, Japan

[21] Appl. No.: 498,135

[22] Filed: May 25, 1983

[30] Foreign Application Priority Data

May 31, 1982 [JP] Japan .................... 57-92604

[51] Int. Cl.³ .............................. F16F 9/34
[52] U.S. Cl. .................... 188/282; 137/512.1; 137/810; 188/315; 188/317; 188/322.15
[58] Field of Search ............ 188/275, 279, 280, 283, 188/314, 315, 316, 317, 318, 319, 320, 282, 322.15; 138/31, 43, 46; 137/512.1, 808, 810

[56] References Cited

U.S. PATENT DOCUMENTS

| | | | |
|---|---|---|---|
| 1,164,371 | 12/1915 | Lovejoy | 188/282 |
| 2,735,515 | 2/1956 | Cloudsley | 188/282 |
| 3,220,517 | 11/1965 | Lorenz | 188/318 |
| 3,362,508 | 1/1968 | Mayer | 188/319 |
| 3,896,908 | 7/1975 | Petrak | 188/322.15 X |
| 4,407,397 | 10/1983 | Fukushima et al. | 188/282 |
| 4,418,802 | 12/1983 | Fukushima et al. | 188/282 |
| 4,437,653 | 3/1984 | Kakimoto | 267/140.1 |
| 4,442,925 | 4/1984 | Fukushima et al. | 188/282 |
| 4,452,436 | 6/1984 | Gute | 188/322.15 X |
| 4,483,521 | 11/1984 | Kakimoto | 267/8 R |

FOREIGN PATENT DOCUMENTS

| | | | |
|---|---|---|---|
| 45973 | 2/1982 | European Pat. Off. | 188/279 |
| 45954 | 2/1982 | European Pat. Off. | 188/279 |
| 49894 | 4/1982 | European Pat. Off. | 188/322.15 |
| 53378 | 6/1982 | European Pat. Off. | |
| 56-90139 | 7/1981 | Japan | 188/282 |
| 2044882 | 10/1980 | United Kingdom | |

Primary Examiner—Douglas C. Butler
Assistant Examiner—R. R. Diefendorf
Attorney, Agent, or Firm—Lane, Aitken & Kananen

[57] ABSTRACT

A vortex flow hydraulic shock absorber for damping relative displacement of two components comprising a piston provided with a fluid passage therethrough including a pair of vortex chambers formed in a movable valve body disposed between a pair of resilient annular discs in a valve chamber in the piston. The valve body moves against the force of the resilient annular discs in response to an increase in the pressure difference of the working fluid on opposite sides of the piston to positions in which the fluid is permitted to bypass one or both of the vortex chambers as it traverses the piston, thereby varying the damping force of the shock absorber.

7 Claims, 6 Drawing Figures

PISTON STROKE RESPONSIVE VORTEX-FLOW SHOCK ABSORBER

BACKGROUND OF THE INVENTION

The present invention relates generally to a vortex-flow hydraulic shock absorber for damping relative displacement of two components, such as a vehicle body and a vehicle wheel. More particularly, the invention relates to a vortex-flow shock absorber in which the damping force varys depending upon a piston stroke and a piston speed.

Published British Patent Application No. 2044882 disclosed a vortex-flow shock absorber with a piston having a chamber through which the working fluid flows in vortex fashion to produce the damping force. The published British application discloses a piston partitioned to have two chambers for producing vortex fluid flow during both the expansion and compression strokes of the piston.

In a vehicle suspension, the shock absorber is required to create a substantially small damping force against a road shock which causes substantially a small piston stroke and to create a large damping force against a cornering force which causes a large piston stroke. A relatively small damping force against the road shock provides the vehicle satisfactory riding comfort. On the other hand, a relatively large damping force against the cornering force may provide driving stability. To provide such piston stroke dependent damping force variable shock absorber, Published European Patent Application No. 0053378 discloses a piston stroke responsive vortex-flow shock absorber in which a variable damping force is created independent of the piston stroke and piston speed. The piston has a valve which is responsive to the pressure difference between the upper and lower fluid chambers of the shock absorber to relieve the fluid pressure in the higher pressure chamber to the lower pressure chamber when the pressure difference exceeds a predetermined set pressure.

The present invention is an improved vortex-flow shock absorber which achieves better shock absorbing characteristics.

SUMMARY OF THE INVENTION

It is an object of the present invention to provide a vortex-flow shock absorber capable of creating vortex fluid flow in a piston during both the expansion and compression strokes of the piston in an improved manner which results in better drivability and better riding comfort.

According to the present invention, there is provided a shock absorber with a reciprocating piston having a valve body defining two vortex-flow chambers in the valve body. Each of the vortex-flow chambers normally communicates with the other vortex-flow chamber via radial passages defined in the valve body and via axial passages defined along the outer periphery of the valve body. When the valve body is in neutral position, working fluid flowing from one fluid chamber to the other as the piston moves must first pass successively through both of the vortex chambers formed in the valve body. The valve body is responsive to the fluid pressure difference between the fluid chambers, and when the pressure difference exceeds a first predetermined pressure, the valve body moves toward the lower pressure fluid chamber to allow working fluid from the higher pressure chamber to flow directly to the periphery of the valve body without passing through one of the vortex flow chambers. A further increase in the pressure difference between the fluid chambers to a value in excess of a second predetermined pressure allows working fluid to flow from the periphery of the valve body directly to the lower pressure fluid chamber to bypass both vortex flow chambers and establish direct fluid communication between higher pressure and lower pressure fluid chambers for relieving excessive fluid pressure in a higher pressure chamber.

In the present invention, the valve body is supported and biased toward the normal position by resilient members. The resilient members provide resilient forces which determine the first and second predetermined pressures.

As set forth, the shock absorber according to the present invention can vary the damping force depending upon the pressure difference between the fluid chambers in order to avoid creating a damping force which would give a rough ride feeling or rigid feeling when the piston stroke is relatively large. On the other hand, the shock absorber according to the present invention creates a relatively small damping force to resist road shocks in response to relatively small piston strokes.

BRIEF DESCRIPTION OF THE DRAWINGS

The present invention will be understood more fully from the following detailed description and from the accompanying drawings of a preferred embodiment of the present invention, which, however, should not be taken as limitative to the invention but for elucidation and explanation only.

In the drawings.

DESCRIPTION OF THE PREFERRED EMBODIMENT

Figure 1:
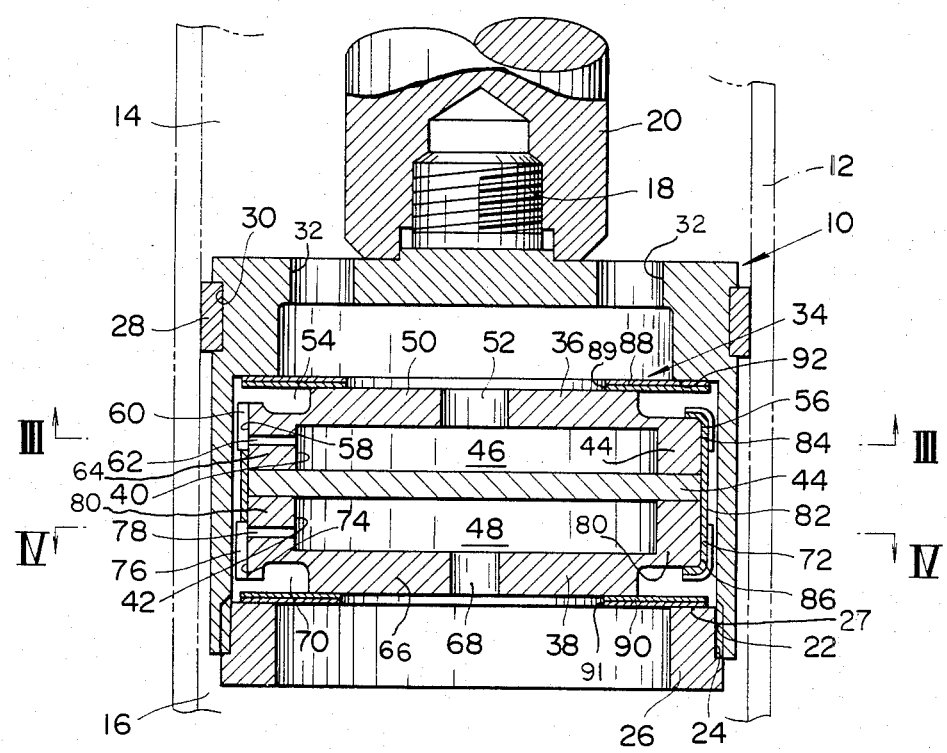
FIG. 1 is a vertical sectional view of a piston in a preferred embodiment of a shock absorber according to the present invention.

Referring now to the drawings, particularly to FIG. 1, there is illustrated a preferred embodiment of a shock absorber according to the present invention. A piston 10 is disposed in an absorber cylinder 12 to define upper and lower fluid chambers 14 and 16 and is reciprocally movable along the axis of the absorber cylinder. The piston 10 has a threaded projection 18 for engagement with a piston rod 20. Piston 10 has a generally reversed cup shape configuration with an open lower end. A thread 22 is formed on the inner periphery of the piston adjacent the lower end for engaging with a mating thread 24 formed on the upper outer periphery of an annular retainer fitting 26. A seal 28 is mounted in a circumferential groove 30 formed on the outer periphery of the piston for liquid tight contact with the inner periphery of the absorber cylinder 12. The piston 10 is further formed with fluid passages 32 for fluid communication between the upper fluid chamber 14 and the interior of the piston.

Figure 2:
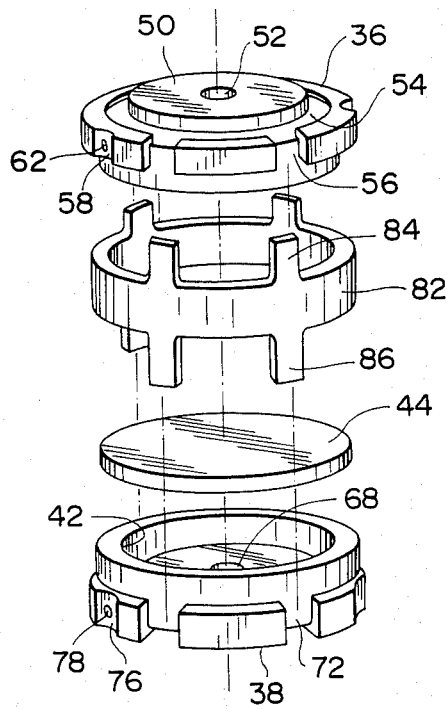
FIG. 2 is an exploded perspective view of the valve body in the shock absorber of FIG. 1.
Figure 3:
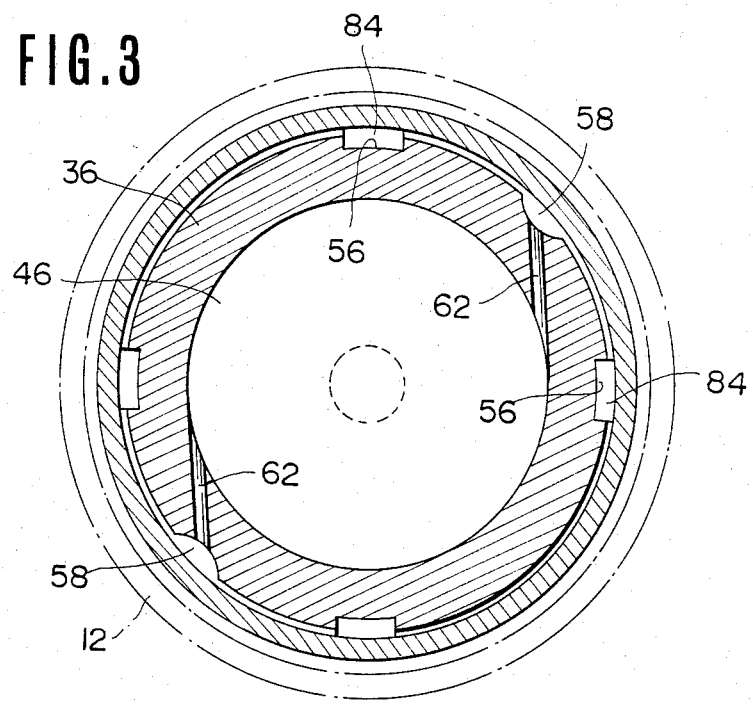
FIG. 3 is a cross-sectional view of the shock absorber taken along line III—III of FIG. 1.
Figure 4:
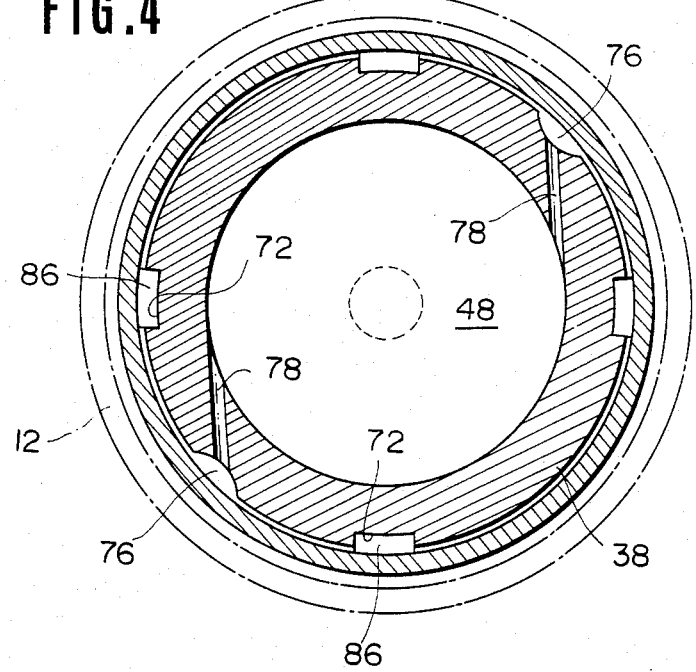
FIG. 4 is a cross-sectional view of the shock absorber taken along line IV—IV of FIG. 1.

A valve body assembly 34 is disposed within a valve chamber formed in the interior of the piston 10. As shown in FIGS. 1 and 2, the valve body assembly 34 comprises a pair of dish-shaped members 36 and 38 defining circular open-ended cavities 40 and 42 on the respectively opposing surfaces, and a partition 44 interpositioned between the dish-shaped members 36 and 38. The cavity 40 of the dish-shaped member 36 and partition 44 define an upper vortex chamber 46. Likewise, the cavity 42 of the dish-shaped member 38 and partition 44 define a lower vortex chamber 48.

On the surface away from the dish-shaped member 38, dish-shaped member 36 has a projecting central portion 50 with a through opening 52. An annular recess 54 is defined around the central portion 50, from which peripheral grooves 56 extend vertically on the outer periphery of member 36.

Another set of peripheral grooves 58 is also formed on the outer periphery of the dish-shaped member 36 to define peripheral passages 60 in communication with the annular recess 54. A vortex generating radial passage 62 extends from each peripheral passage 60 and has an axis tangentially aligned with the circumference of the cavity 40 at the inner end of the passage. The dish-shaped member 36 further defines a circumferential rest 64 on the outer periphery extending along the lower end circumference thereof.

Similar to member 36, dish-shaped member 38 is formed with a projecting central portion 66 having a central through opening 68 and with an annular recess 70 around the central portion 66 on the surface away from the dish-shaped member 36. A plurality of peripheral grooves 72 extend from the annular recess 70 along the outer periphery of the dish-shaped member 38. Another set of peripheral grooves 74 is formed on the outer periphery of dish-shaped member 38 to define peripheral passages 76 thereon in communication with the annular recess 70. Each peripheral passage 76 communicates with the cavity 42 via a vortex generating radial passage 78. Member 38 is further formed with a circumferential rest 80 extending along the upper end circumference thereof.

A retainer ring 82 with upper and lower legs 84 and 86, respectively, is seated on the circumferential rests 64 and 80 of the dish-shaped members 36 and 38 with the upper and lower legs received within the peripheral grooves 56 and 72, respectively. The upper and lower legs 84 and 86 are bent adjacent respective ends thereof to engage portions of the peripheral grooves 56 and 72 lying on the horizontal end surfaces of the dish-shaped members 36 and 38 to retain the dish-shaped members and the partition in an assembled position.

Spring discs 88 and 90, respectively, having diameters substantially corresponding to the outer diameters of the dish-shaped members 36 and 38 and having central opening 89 and 91 are disposed adjacent the central portions 50 and 66, respectively. The outer circumference of spring disc 88 opposes a stepped edge 92 of the inner periphery of the piston 10. The outer margin of spring disc 90 opposes the upper surface 27 of retainer fitting 26. Spring discs 88 and 90 bias the valve body assembly 34 toward a neutral position in which direct flow of working fluid between the fluid chambers 14 and 16 and the peripheral grooves on the valve body is prevented.

When the shock absorber is used in a vehicle suspension, the piston is connected to the vehicle body via the piston rod, and the absorber cylinder is connected to the vehicle wheel. When the vehicle body and the vehicle wheel move toward each other, the piston strokes in the compression direction, and when the vehicle body and the vehicle wheel move away from each other, the piston strokes in the expansion direction.

In the piston compression stroke, the piston 10 moves downwardly, and the working fluid in the lower fluid chamber 16 is compressed. As a result, the fluid pressure in the lower fluid chamber becomes higher than that in the upper fluid chamber 14 to create fluid flow through the piston 10.

When the piston stroke is small, the fluid pressure difference remains smaller than a first set pressure of the spring disc 88, and the valve body 34 is maintained at the neutral position. If the piston stroke is substantially small, the working fluid flows from the lower fluid chamber 16 through the through opening 91, opening 68, the lower vortex chamber 48, vortex generating radial passage 78, the peripheral passages 76 and 60, the vortex generating radial passage 62, the upper vortex chamber 46, opening 52, opening 89 and through opening 32 to the upper fluid chamber 14 without causing vortex pattern fluid flow in the vortex chambers. Thus, for the substantially small piston stroke caused by the road shock, for example, damping force is only created by fluid resistance provided by the fluid passages. If the piston stroke is larger than that of the foregoing and the fluid pressure difference is still smaller than required to move the valve body 34, the valve body is maintained at the neutral position, the working fluid from the lower fluid chamber 16 flows through the through opening 91, opening 68, the lower vortex chamber 48, vortex generating radial passage 78, the peripheral passages 76 and 60, the vortex generating radial passage 62, the upper vortex chamber 46, opening 52, opening 89 and through opening 32 to the upper fluid chamber 14. For this fluid flow, the peripheral passages 76 and 60 and the vortex generating radial passages 78 and 62 provide flow resistances due to their relatively small path area and orifice effect. Further, the fluid flow through the vortex generating helical passage 62 creates vortex fluid flow in the upper vortex chamber 46 to serve as a flow-resistance.

As set forth, with valve body 34 in the neutral position, the damping force is created by the orifice effect in the various fluid passages and the vortex fluid flow in the upper vortex chamber 46. In this state, the fluid flow resistance provided by the vortex pattern fluid flow in the vortex chambers and orifice effects provided by the fluid passages is increased depending upon increasing of the piston stroke and piston speed. Therefore, depending upon increasing of the piston stroke and piston speed, the damping force produced by the shock absorber is increased.

Here, if the damping force created by the shock absorber is not limited and thus is increased substantially proportional to the piston stroke and piston speed, the shock absorber may serve as a substantially rigid member against substantial displacement between the vehicle body and vehicle wheel to cause a substantially large piston stroke to give rough ride feeling.

Figure 5:
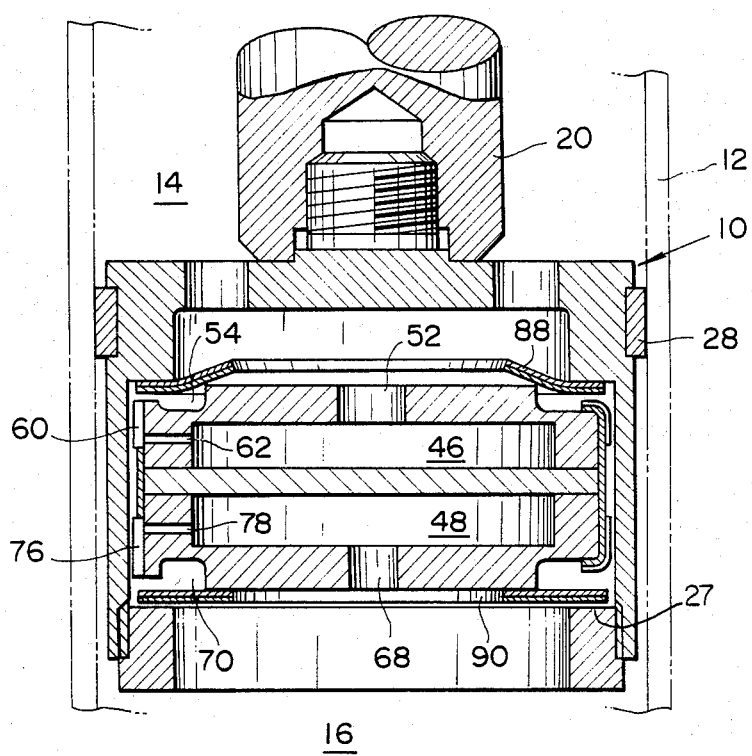
FIG. 5 is a sectional view smaller to FIG. 1, in which the valve body is shifted to a first shifted position.

For preventing the shock absorber from creating an excessive damping force, when the piston stroke produces a pressure difference in the fluid pressure between the upper and lower fluid chambers 14 and 16 above the first set pressure of spring disc 88, the spring disc is deformed and valve body 34 is shifted upwardly to a first shifted position as shown in FIG. 5. As a result of the upward shifting of the valve body 34, the spring disc 90 disengages from the upper surface 27 of the fitting 26 or from the central portion 66 of member 38 to form a bypass channel through which fluid may flow directly from lower fluid chamber 16 to peripheral grooves 76 and 58, thereby bypassing the lower vortex chamber 48 and helical passage 78. As a result, the resistance against the fluid flow is reduced as the fluid flow bypassing the lower vortex chamber 48 and the helical passage 78 is established, and the increasing rate of the damping force in dependence on the piston stroke is thus reduced.

Figure 6:
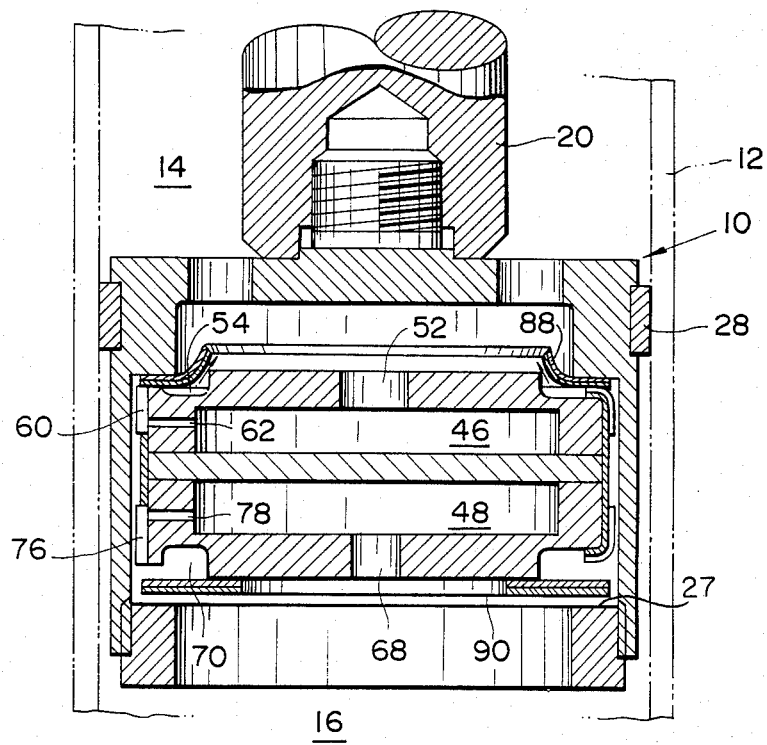
FIG. 6 is a sectional view similar to FIG. 1, in which the valve body is shifted to a second shifted position.

As a result of an even further or faster stroke of the piston 10 towards the lower fluid chamber 16, the fluid pressure difference between the upper and lower fluid chambers 14 and 16 is increased even more. Valve body 34 is shifted even further upward to a second shifted position shown in FIG. 6 in which the upper circumferential edge of the valve body 34 contacts the outer circumferential portion of the spring disc 88. The pressure from fluid chamber 16 is transmitted via grooves 76 and 60 and annular recess 54 to the inner circumference of spring disc 88, and the spring disc is further deformed gradually according to the increased pressure difference.

When the pressure difference between the first and second fluid chambers exceeds a given value beyond the second set pressure to deform the spring disc 88 beyond a predetermined magnitude, the inner circumference of spring disc 88 moves upwardly away from the central portion 50. The higher fluid pressure applied to the inner circumference of the spring disc 88 overcomes the second set pressure to release the inner circumference from the central portion 50 to form a clearance or bypass channel therebetween. By this, the pressurized fluid from the lower chamber 16 flows through the bypass channel formed between the upper surface of the fitting 26 and the spring disc 90, the peripheral passages 76 and 60, the annular recess 54 and the clearance or bypass channel formed between the spring disc 88 and the central portion 50. Thus, both vortex flow chambers and their associated radial passageways are bypassed and thus the increasing rate of the damping force produced by the shock absorber is further reduced so that excessive damping force against substantially large piston stroke may not be produced.

In the piston expansion stroke, the damping force created by the piston is varied in reverse fashion in substantially the same manner as set forth.

What is claimed is:

1. A vortex-flow shock absorber for damping relative displacement of two components, comprising:
   a hollow cylinder filled with a working fluid and fixed to one of said components for movement therewith;
   a piston sealingly disposed within said hollow cylinder for axial movement and defining upper and lower fluid chambers in said cylinder; said piston being fixed to the other of said components for movement therewith;
   means defining a fluid passage through said piston through which working fluid may pass between said upper and lower fluid chambers; said fluid passage comprising a first vortex chamber for producing vortex fluid flow which creates a damping force during a piston expansion stroke and a second vortex chamber for producing vortex fluid flow which creates a damping force during a piston compression stroke;
   means responsive to a working fluid pressure difference between said upper and lower fluid chambers exceeding a first predetermined value for permitting a flow of working fluid through said piston to bypass one of said vortex chambers; and
   means responsive to a working fluid pressure difference between said upper and lower fluid chambers exceeding a second predetermined value greater than said first value for permitting a flow of working fluid through said piston to bypass the other of said vortex chambers.

2. A shock absorber as set forth in claim 1 wherein said pressure difference responsive means comprise:
   a valve body disposed in a valve chamber within said piston; said fluid passage passing through said valve body, and said first and second vortex chambers being formed in said valve body, and
   means for biasing said valve body toward a neutral position in which direct fluid flow from said fluid chambers around the periphery of said valve body is prevented.

3. A shock absorber as set forth in claim 2 wherein said biasing means comprise a pair of resilient annular discs in said valve chamber having said valve body disposed between them with each end of said valve body being in contact with one of said discs when said valve body is in said neutral position.

4. A shock absorber as set forth in claim 2, wherein said fluid passage includes a plurality of axial passages on the outer periphery of said valve body and radial passages respectively opening to said first and second vortex chambers at the inner ends thereof, said radial passages being oriented tangentially with respect to the circumferential periphery of said first and second vortex chambers.

5. A shock absorber as set forth in claim 4, wherein said axial passages establish fluid communication
   between said radial passages respectively opening towards said first and second vortex chamber when the pressure difference between said first and second fluid chambers is less than said first value;
   between one of said fluid chambers in which the fluid pressure is higher than the other and one of said vortex chambers to produce a vortex fashion fluid flow, bypassing the other vortex chamber, when the pressure difference between said first and second fluid chambers is greater than said first value but less than said second value; and
   between said one fluid chamber and the other fluid chamber, bypassing said first and second vortex chambers, when the pressure difference between said first and second fluid chambers is greater than said second value.

6. A shock absorber as set forth in claim 5, wherein said means for biasing said valve body toward said neutral position comprises resilient members disposed adjacent said valve body, said resilient members being deformable in response to a fluid pressure difference greater than said first predetermined value to allow said valve body to move in order to vary said flow resistance.

7. A shock absorber as set forth in claim 6, wherein said means for moving the valve body to vary said fluid flow resistance comprises circumferential edges of said resilient members operating in such a manner that:
  at said neutral position, said resilient members are in contact with seat portions of said valve body for blocking direct fluid communication between said fluid chambers and said axial passages;
  at the position wherein said valve body is moved in response to a fluid pressure difference exceeding said first predetermined value but below said second predetermined value, one of said resilient members disengages from the corresponding seat portion to allow direct fluid flow between said one fluid chamber and said axial passages; and
  when the fluid pressure difference exceeds said second predetermined pressure, the inner circumferential edge of the other resilient member disengages from said valve body to establish direct fluid communication between said axial passages and the other of said fluid chambers.

* * * * *